Oct. 29, 1968     ISOE TAKEZAWA ET AL     3,407,771

METHOD OF JOINING PARTS OF A STRUCTURE FLOATING ON THE WATER

Filed Dec. 19, 1966     2 Sheets-Sheet 1

INVENTORS
ISOE TAKEZAWA
ICHIZO TAKIZAWA
DAN OHNO
BY McGlew and Toren
ATTORNEYS

INVENTORS
ISOE TAKEZAWA
ICHIZO TAKIZAWA
DAN OHNO

ATTORNEYS

United States Patent Office 3,407,771
Patented Oct. 29, 1968

3,407,771
METHOD OF JOINING PARTS OF A STRUCTURE FLOATING ON THE WATER
Isoe Takezawa, Tokyo, Ichizo Takizawa, Yokohama-shi, and Dan Ohno, Tokyo, Japan, assignors to Mitsubishi Jukogyo Kabushiki Kaisha, Tokyo, Japan
Filed Dec. 19, 1966, Ser. No. 602,880
Claims priority, application Japan, Aug. 15, 1966, 41/53,608
6 Claims. (Cl. 114—77)

ABSTRACT OF THE DISCLOSURE

A method and an apparatus for joining parts of a ship hull structure together while they are floating in the water includes the use of a first flat holding plate which is secured to the exterior of a shell plate of a first hull part so that it projects outwardly from the shell plate. The projecting shell plate of a second hull part which is to be joined to the first part is provided with an exterior holding plate which does not extend out to the outer end thereof. The two hull parts are moved together so that the first holding plate underlies the shell plate of the second hull part and abuts against the holding plate secured to the second hull part shell plate. The two shell plates are arranged in water tight engagement preferably with the interposition of a packing therebetween and the shell plates of the two joined hull parts are welded together.

---

The present invention relates to a method of joining parts of a structure floating on the water.

Hitherto, in building or rebuilding a structure such as a ship floating on the water, the joining of parts of the hull thereof has usually been performed on a building berth or in a dock. Recently constructed ships show a tendency to have a much higher tonnage and it has been required to construct huge ships, for instance of 200,000 to 300,000 tons and also to rebuild the hull of a ship in order to make it much larger. Most part of building berths or of dock installations existing in our country, however, have not a capacity for the construction or rebuilding of larger ships as mentioned above. Even the remaining part thereof are not always suitable though may have such capacity, because much time would be necessary for moving the huge hull and a ship value would be higher.

Accordingly, it has been proposed that in constructing a huge ship or in rebuilding the hull of a ship to obtain a huge one parts of the ship, which is floating on the water, are joined to one another.

Indeed, it is not impossible to join parts of a structure such as a ship floating on the water by underwater welding that is carried on by divers, but such underwater performance is not desirable because of dangers incidental thereto, inefficiency due to bad working conditions and unreliability of worked portions (for instance welded ones). Consequently, a method of obtaining a non-submerged place suitable for performing cutting and welding has been proposed, in which the place can be obtained by watertightly covering under water joining portions of a structure floating on the water with either a waterproof band or an adjustably floating caisson and further by discharging water from the place obtained by using the band or the caisson.

As a waterproof body just mentioned, for example, a U-shaped hollow box, a L-shaped hollow box, a bellows-type box with cross-section which is U-shaped or hoof-shaped, etc. have already been proposed. Since these hollow boxes have to be constructed to a floatable at a given height above the water level, the manufacturing cost is higher and the operation is more complicated. Furthermore, in the case of the bellows-type box, there are really difficult problems in the manner in which the box should be fixed to the underwater part of a structure such as the hull of a ship floating on the water and should keep watertight after the fixing. For instance, it is the most usual manner to fix the bellows-type box to the hull of a ship by means of a large number of stud bolts provided, by underwater welding and the like, on the outer plate thereof. The provision of said bolts, in the water, at a small pitch and at proper positions on the shell plate for keeping watertight is so difficult that in some cases the tightness obtained is perhaps unreliable. Furthermore, after the joining of parts of the hull, said bolts have to be removed by underwater cutting or the like. Thus, long period and much cost are needed for the performance, while its safety still looks doubtful.

Accordingly, an object of the present invention is to provide a new method of joining parts of a structure floating on the water. The method of the invention is simple, safe and accurate without using any waterproof body which is, as mentioned above, needed for covering the underwater part of the structure so as to keep said part watertight and for forming a non-submerged place.

Another object of the present invention is to provide a method of uniting, in the floating condition, parts of a structure such as a ship floating on the water, characterized in that a watertight transverse bulkhead extending from the bottom of the structure to at least the water line is provided at each of said parts, that holding members to engage with each other through packing elements so as to keep the underwater parts of joining portions watertight are provided at corresponding positions on the shell plates of both sides of the structure, that the joining portions of the structure are made to be so adjacent to each other that said holding members engage with each other to form a watertight place, that the joining portions exclusive of the underwater parts are then welded together, and that after the discharge of water from the watertight place the underwater parts of the joining portions are welded together at the inside of the structure.

For an understanding of the principles of the invention, reference is made to the following description of a typical embodiment thereof illustrated in the accompanying drawings, wherein.

Figure 2:
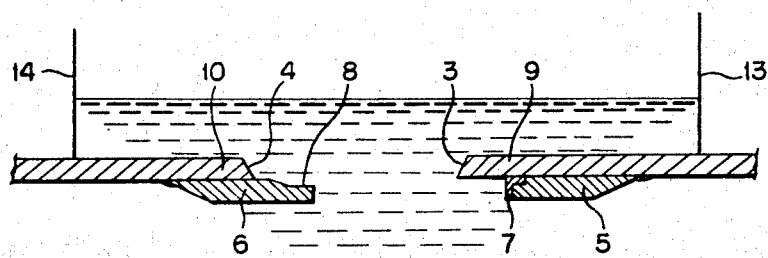
FIG. 2 is an enlarged sectional view of the bottom parts of the joining portions of the hull shown in FIG. 1.

In the embodiment of the invention shown in the drawings, a fore hull part of a ship whose both hull parts are to be separately constructed either on the respective building berths or in the respective docks is designated by 1, while a rear hull part thereof is designated by 2. A holding member 5 is welded to the underwater part of the joining portion 3 of the fore hull part 1 along the joining edge of the shell plate 9 of the hull, as shown in FIG. 2. Likewise, a holding member 6 is welded to the underwater part of the joining portion 4 of the rear hull part 2 along the joining edge of the shell plate 10 of the hull.

These holding members 5, 6 are separately welded to the respective shell plates during the separate constructions of the fore and the rear hull part on the respective building berths or in the respective docks. In welding said members, one of them, the holding member 6, is made to protrude beyond the joining portion 4, while the other member 5 is made to recede from the joining portion 3, as shown in FIG. 2. A packing element 7 is fixed to the holding member 5, being abutted, when both parts of the hull are closely drawn together, against the corresponding holding member 6 so as to keep the inside of the hull watertight. A guide portion 8 provided on the holding member 6 serves to facilitate the proper engagement of both parts 1, 2 of the hull by guiding the shell plate 9 so that the joining portions 3, 4 may be adjacent to each other. A weld gap 11 is designed so as to give an adequate distance when the holding members 5, 6 are abutted against each other. A weld 12 shows that shell plates 9, 10 have been welded together. Watertight bulkheads 13, 14 are provided in the fore and the rear hull part, respectively, so that the joining portions 3, 4 may properly be placed between the bulkheads 13, 14. These bulkheads, together with the shell plates 9, 10, serve to form part of the hull which is a watertight place 15. A gap 16 provided between the shell plate 9 and the guide portion 8 is filled with water, which is discharged therefrom after the joining of both parts of the hull. The gap 16 is plugged by a waterproof putty and the like after the joining by welding of both parts of the hull. Although the L-shaped packing element 7 is shown, the packing element may be of T-shape. Thereby, the gap 16 is plugged up to keep watertight.

The performance of the joining of the hull parts in accordance with the present invention will now be described.

Figure 4:
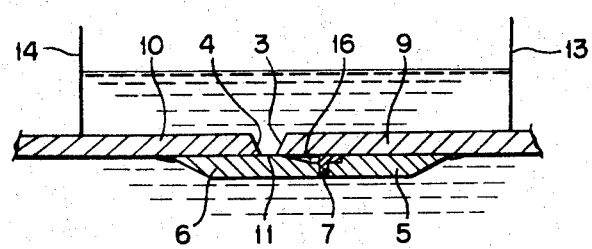
FIG. 4 is an enlarged sectional view of the bottom parts of the joining portions of the hull shown in FIG. 3.

First, in separately constructing the fore and the rear hull part on the respective building berths or in the respective docks, watertight bulkheads 13, 14 are assembled near the respective joining portions. At the same time, holding members 5, 6 are welded, along the joining edges of the shell plates 9, 10, to the underwater parts thereof respectively. In the welding, the holding member 6 is made to protrude beyond the joining portion 4 of the shell plate 10 and further is formed with the guide portion 8 for facilitating a guide of the shell plate 9 and also a positioning of both hull parts 1, 2. On the other hand, the holding member 5 is made to recede from the joining portion 3 of the shell plate 9. Furthermore, the weld gap 11 is formed between the joining portions 3, 4 in the abutted condition of the holding members 5, 6, as shown in FIG. 4. The packing element 7 is then fixed to the engaging side of the holding member 5.

Figure 1:
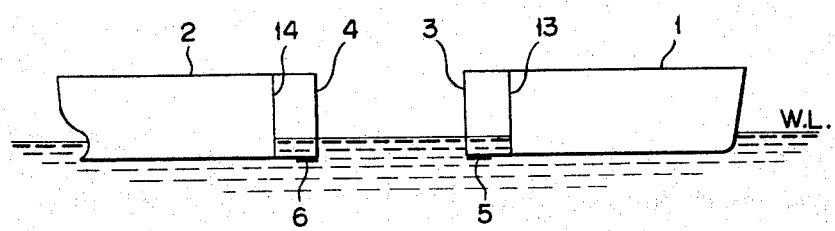
FIG. 1 is a side view of each of both parts of the hull to be joined.
Figure 3:
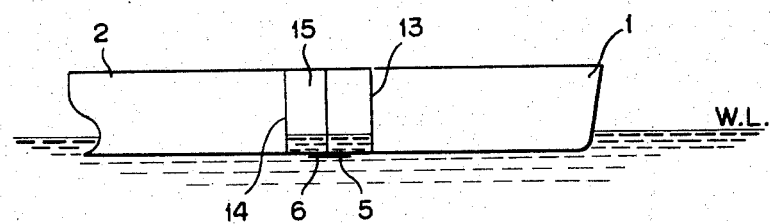
FIG. 3 is a side view showing both parts of the hull shown in FIG. 1 which are led to a welding position, where the upper parts of the hull exclusive of the underwater parts thereof are joined by welding.
Figure 5:
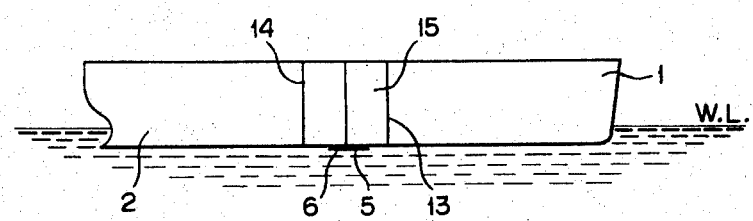
FIG. 5 is a side view of the hull showing that water has been discharged from a watertight place formed on the joining portions of the hull shown in FIG. 3.

The hull parts 1, 2 separately constructed, as mentioned above, on the respective building berths or in the respective docks are separately launched and are led, on the water, to a joining position as shown in FIG. 1. The hull parts 1, 2 which are thus floating near each other are properly positioned by adjusting the ballasts or by using the guide portion 8. After the positioning, fitting pieces not shown are fixed to decks and also both sides of the hull parts 1, 2. For instance, one of said pieces is formed with a protruding part, while the other is formed with a receiving part. Thereby, fitting pieces on the hull part 1 may be fitted on those on the hull part 2 and therefore both hull parts are fixed to each other in the longitudinal, transverse and vertical directions.

Figure 6:
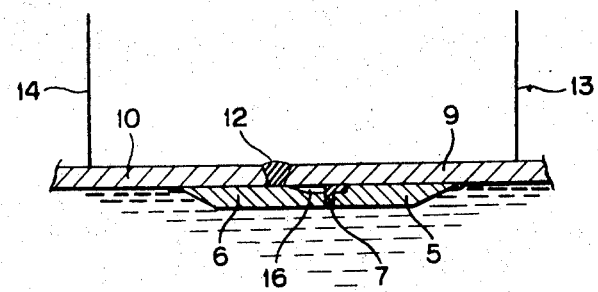
FIG. 6 is an enlarged sectional view of the bottom parts of the joining portions of the hull shown in FIG. 5, showing the underwater parts of said joining portions having been joined by welding.

Upper parts of the joining portions, exclusive of the underwater parts, are then welded together, Since, in this condition, the holding members 5, 6 are in engagement through the packing element 7, the place 15 formed in the hull becomes watertight and water therein is discharged by means of a not shown pump. As this discharge proceeds, the whole of the hull is subjected to a so-called hogging and therefore the upper hull part is under tension while the lower hull part is under compression. Thus, the balancing of the fore and the rear hull part is needed. Finally, the underwater parts of the joining portions 3, 4 are joined by blacksmith welding at the inside of the watertight place 15, as shown in FIG. 6. Thus, the joining operation is completed. In the case of the present invention, the holding members 5, 6 are not removed, but remain as parts of the outer plates respectively. Apparently, these members are very small-sized, as compared with the length of the hull, and further are formed with the fore and rear sides slanting to the hull, respectively. Thereby, the holding members are quite negligible with respect to the hull resistance. Since these members are not welded together, the outsides of the engaging portions thereof might be subjected to corrosion due to the invasion by water. The invasion, however, may be prevented by plugging up said engaging portions and for this purpose, if necessary, a filler such as a waterproof putty may be used. Likewise, the gap 16 provided between the guide portion 8 and the outer plate 9 may be filled with the waterproof putty so as to keep watertight.

Furthermore, as the bulkheads 13, 14, provisional ones removable after the joining operation as well as permanent ones constituting the hull may be used.

As described above, in accordance with the present invention, a structure such as a ship floating on the water parts of which are to be joined in the floating condition is provided with watertight transverse bulkheads extending from the bottom of the structure to at least the water line and is provided with holding members correspondingly on the shell plates of the sides of the structure; joining portions of the parts of the structure are placed between the holding members; the holding members are, by abutting the joining portions, made to engage with each other through a packing element so as to keep the underwater parts of the joining portions watertight; the joining portions exclusive of the underwater parts are then welded together so as to form a watertight place; water in the place is discharged; and the watertight parts of the joining portions are welded together at the inside of the structure. Accordingly, a simple, safe and accurate joining of a structure floating on the water can be obtained without using the conventional waterproof band as already described. Consequently, the present invention is a very useful one for the industry.

It is to be understood that various modifications of the disclosed embodiment may be made without departing from the spirit and scope of the present invention as set forth in the appended claims.

What is claimed is:

1. A method of joining parts such as ship hull structure parts together while they are floating in the water, using holding members which are secured to the exterior of each part at least below the water line, the holding member of one part projecting outwardly from its associated part and the holding member of the other part being spaced inwardly from the end of the associated part, comprising arranging the two parts together so that the edge of one is guided over the projecting holding member of the other and moving the holding members together into water-tight engagement with the opposite holding member, and evacuating the water from the interior of the parts and welding the two parts together.

2. A method according to claim 1, including interposing a packing between the holding members of each part.

3. A method according to claim 1, including interposing a packing between the projecting holding member and the holding member which does not extend to the end of its associated part, and leaving a small area of one of the holding members without packing which is later filled after the hull parts are positioned together.

4. A hull structure formed by joining together two hull structure elements when they are floating in the water, comprising a first hull part having an exterior shell plate, a first holding member secured to the exterior of said first shell plate and projecting outwardly therefrom, a second hull part having an exterior second shell plate overlying said first holding member and being welded to said first shell plate, said second hull part having a second holding member secured to the exterior surface of said second shell plate and abutting against said first holding member in water tight engagement therewith.

5. A hull structure according to claim 4, wherein said holding members are beveled on their outer ends and welded to the underlying hull structure.

6. A hull structure according to claim 4, wherein each of said holding members includes a recess for accommodating a packing and a packing disposed in the recess between said holding elements.

References Cited

UNITED STATES PATENTS

| | | | |
|---|---|---|---|
| 1,877,235 | 9/1932 | Goodyear | 114—79 |
| 1,926,517 | 9/1933 | Filippi et al. | 285—21 |
| 2,613,088 | 10/1952 | Burke | 285—22 |
| 2,644,418 | 7/1953 | Allegro | 114—79 |

MILTON BUCHLER, *Primary Examiner.*

TRYGVE M. BLIX, *Assistant Examiner.*